United States Patent [19]

Labelle et al.

[11] Patent Number: 5,713,321
[45] Date of Patent: Feb. 3, 1998

[54] ANTITHEFT INTERRUPT SYSTEM FOR VEHICLE STARTER POWER CIRCUIT

[75] Inventors: James L. Labelle, Murrieta; Kenneth D. Arnold, Poway, both of Calif.

[73] Assignee: Labken Inc., Cardiff, Calif.

[21] Appl. No.: 680,779

[22] Filed: Jul. 16, 1996

Related U.S. Application Data

[63] Continuation of Ser. No. 577,977, Dec. 22, 1995, Pat. No. 5,564,376.
[51] Int. Cl.[6] .................................................. B60R 25/04
[52] U.S. Cl. .................... 123/179.3; 290/38 R; 307/10.3
[58] Field of Search ........................... 123/179.3, 179.25; 307/10.3, 10.4, 10.5; 180/287; 290/38 R

[56] References Cited

U.S. PATENT DOCUMENTS

| | | | |
|---|---|---|---|
| 3,749,930 | 7/1973 | Roe | 307/10.5 |
| 4,315,160 | 2/1982 | Levine | 307/10.3 |
| 4,533,016 | 8/1985 | Betton | 307/10.4 |
| 4,733,638 | 3/1988 | Anderson | 123/198 B |
| 5,079,436 | 1/1992 | Elkins | 307/10.3 |

*Primary Examiner*—Andrew M. Dolinar
*Attorney, Agent, or Firm*—John L. Rogitz

[57] ABSTRACT

A vehicle antitheft system includes a housing connectable to the casing of a starter motor and a silicon controlled rectifier (SCR) disposed in the housing. The system includes a battery connector which engages the starter motor power line from the battery, and a starter connector which engages the power terminal of the starter motor, with the SCR being in electrical series between the connectors. A control circuit is mounted in the housing, and the control circuit closes the power switch for a predetermined period upon receipt of an enable signal from a hand-held rf generator. Consequently, the vehicle can be started by turning the ignition switch only during the predetermined period.

17 Claims, 2 Drawing Sheets

ANTITHEFT INTERRUPT SYSTEM FOR VEHICLE STARTER POWER CIRCUIT

This application is a continuation of application Ser. No. 08/577,977, filed Dec. 22, 1995, now U.S. Pat. No. 5,564,376.

FIELD OF THE INVENTION

The present invention relates generally to vehicles, and more particularly to override-resistant vehicle antitheft systems.

BACKGROUND

Vehicle antitheft systems have been provided that function by disabling a component in the ignition system of a vehicle unless a security code is transmitted to the system prior to starting the vehicle. An example of such a device is disclosed in U.S. Pat. No. 4,733,638 to Anderson, which discloses a transmitting device that can be manually operated to energize a relay within the casing of a vehicle starter motor. In turn, the relay, once energized, closes an auxiliary contact that is also located in the casing of the starter motor to thereby complete the electrical path from the vehicle's battery to a conventional starter solenoid. In accordance with well-known principles, when the ignition key is rotated to close the ignition switch, the starter solenoid both engages the Bendix gear of the starter with the vehicle flywheel, and closes a conventional starter switch to complete the electrical path between the battery and the starter motor to turn the Bendix gear and flywheel, thereby starting the vehicle.

Accordingly, the Anderson device, like many if not most such antitheft systems, does not directly control power to a starter motor, but rather indirectly controls power to the starter motor by controlling power to the starter solenoid. A principal reason why power to the solenoid is controlled is that the electrical current drawn by the solenoid is much less than the current drawn by the starter motor, thus permitting the use of relatively small, inexpensive auxiliary contacts by the antitheft systems.

While somewhat effective, existing antitheft systems have certain drawbacks. For example, because many of its components are located within the casing of the starter motor, the Anderson device mentioned above cannot be easily integrated with existing starter motors. Further, from the above discussion it will be appreciated that the Anderson device is intended for use with ignition systems wherein the solenoid is housed with the starter motor. Indeed, the Anderson device cannot be used in conjunction with ignition systems wherein the solenoid is not co-housed with the starter motor.

Unfortunately, antitheft systems which can disable a starter solenoid that is housed apart from the starter motor are relatively easy to defeat. This is because the solenoid is typically mounted in a location on the vehicle that relatively easy to access, compared to accessing the starter motor, and requires the jumpering of a relatively small amount of current, compared to the current that must be jumpered to defeat a circuit element in the main power line to the starter motor. As accordingly recognized by the present invention, it would be advantageous to provide a vehicle antitheft system which can be easily and quickly mounted in a comparatively inaccessible location, i.e., on the starter motor casing, which is difficult to defeat by jumpering, and which can be used in conjunction with existing stock starter motors.

It is therefore an object of the present invention to provide a vehicle antitheft system that can be used in conjunction with existing starter motors. Another object of the present invention is to provide a vehicle antitheft system that can be easily and quickly mounted on the starter motor casing of a vehicle. Yet another object of the present invention is to provide a vehicle antitheft system that is relatively difficult to defeat by jumpering. Still another object of the present invention is to provide a vehicle antitheft system that interrupts power to the starter motor of a vehicle, unless an enable signal is transmitted to the vehicle. Another object of the present invention is to provide a vehicle antitheft system that is easy to use and cost-effective.

SUMMARY OF THE INVENTION

This invention concerns a vehicle antitheft system that is actuated by a portable signal generator, preferably an rf transmitter, and that is connected to the starter motor of a vehicle for selectively interrupting the starting current power line between the battery and the starter motor.

The starter motor includes starter motor windings, a casing, and a power terminal electrically coupled to the starter motor windings. In accordance with the present invention, the antitheft system includes a housing that is connectable to the casing of the starter motor via a rigid adapter or by means of mounting the housing on the battery cable in electrical series therewith, near the starter motor. A battery connector is configured for engaging the power line, and a starter connector is configured for engaging the power terminal of the starter motor. A power switch, preferably a solid state device such as a silicon controlled rectifier (SCR), is disposed in the housing in electrical series between the battery connector and starter connector. Per the present invention, a control circuit is electrically connected to the power switch, and the control circuit is responsive to an enable signal to close the power switch upon receipt of the enable signal.

In the preferred embodiment, the antitheft system includes a portable enable signal generator for generating the enable signal. Also, the preferred control circuit includes a time delay circuit for causing the SCR to open when a predetermined period after receipt of the enable signal has elapsed. Moreover, the control signal includes an audible alarm, and the control circuit activates the audible alarm during the predetermined period.

The vehicle on which the present antitheft system is used includes an ignition switch. As intended herein, the preferred control circuit includes a voltage regulator for maintaining a predetermined constant voltage to the starter motor windings during the predetermined period when the ignition switch is closed.

In another aspect of the present invention, an antitheft system for completing an electrical path between a vehicle battery power line and a vehicle starter motor upon receipt of an enable signal includes an enable signal generator for generating the enable signal. Moreover, the antitheft system includes a power switch which is juxtaposed with the starter motor and which is connected in series between the battery power line and the starter motor. A control circuit receives the enable signal and closes the power switch in response thereto.

In still another aspect of the present invention, a method is disclosed for electrically connecting a battery to a power terminal of a starter motor of a motor vehicle. The present method includes disposing a power switch and a control circuit for controlling the power switch in a housing, and mounting the housing in juxtaposition with the starter motor. Both the battery and starter motor are then electrically connected to the power switch. An enable signal is transmitted to cause the control circuit to close the power switch.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
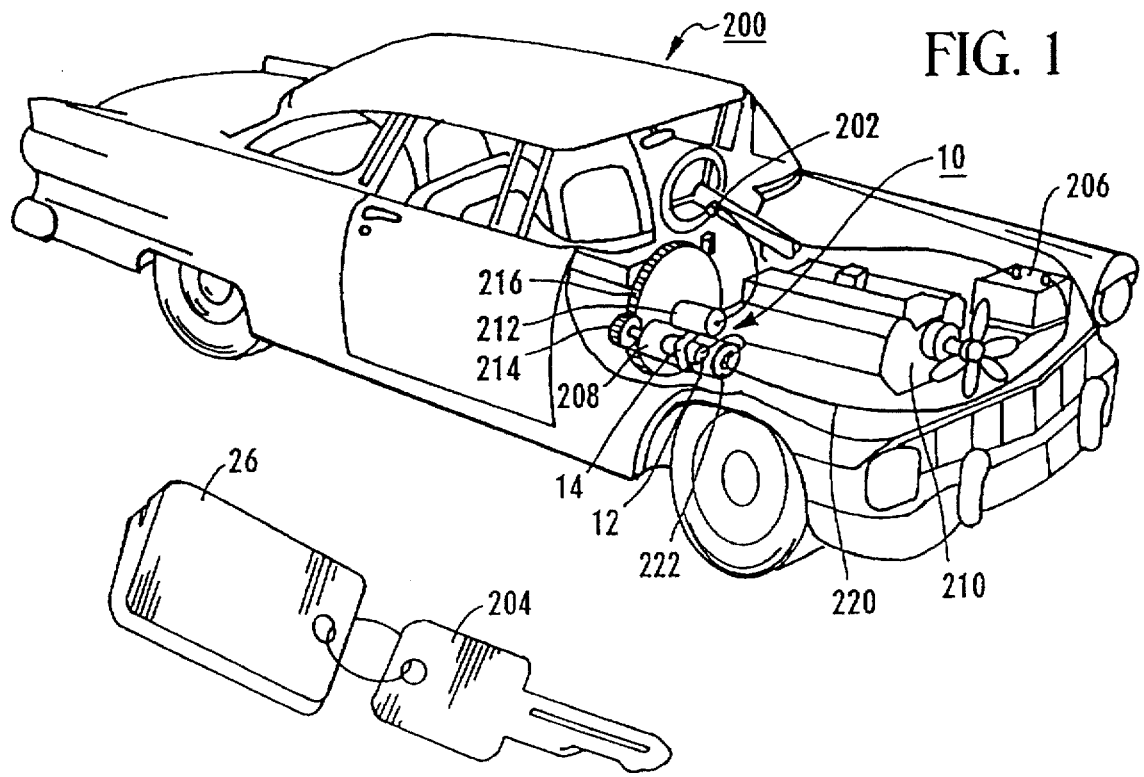
FIG. 1 is a perspective view of the antitheft system of the present invention, shown in its intended environment, with portions cut away for clarity.

Referring initially to FIG. 1, the intended environment of the present invention can be seen. A motor vehicle, generally designated 200, includes an ignition switch 202 that can be closed by means of a key 204 to complete the electrical path between a battery 206 and a starter motor 208 and thereby start the engine 210 of the vehicle 200. Specifically, in a conventional ignition system, when the ignition switch 202 is closed, a starter solenoid 212 is electrically connected to the battery 206, energizing the solenoid 212. In turn, the solenoid 212 engages a so-called Bendix gear 214 with the flywheel 216 of the vehicle 200. Also, in a conventional ignition system the solenoid 212 closes a starter switch 218 (FIG. 2) in a starting current power line 220 to complete the electrical circuit between the battery 206 and the starter motor 208. Thereby, the starter motor 208, which is coupled to the Bendix gear 214, is caused to rotate the Bendix gear 214 and, hence, the flywheel 216, starting the engine 210.

It will be appreciated that the current flowing through the starting current power line 220 must be relatively high to generate the torque necessary to turn the flywheel 216. The intention of the present invention is to interpose an antitheft system, which is responsive to a coded signal, in the starting current power line 220 between the battery 206 and the starter motor 208. Consequently, as the present invention recognizes, jumpering of the antitheft system is made difficult in that relatively high starting current must be jumpered to do so. Further, the antitheft system of the present invention is physically juxtaposed with the starter motor 208, which is typically located in a location that is difficult to access. By "physically juxtaposed" is meant that the antitheft system is mounted on or within a few inches of the starter motor 208. Consequently, physically tampering with the present antitheft system is inhibited.

Figure 2:
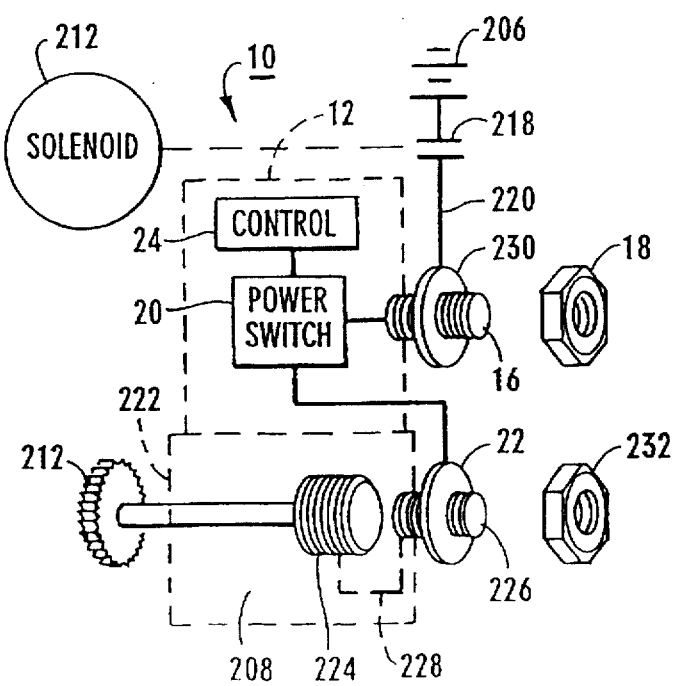
FIG. 2 is a partially schematic view of the antitheft system of the present invention, with portions shown in phantom.

With the above disclosure in mind, in cross-reference to FIGS. 1 and 2 an antitheft system, generally designated 10, includes a hollow plastic or metal housing 12 that is mounted on a casing 222 of the starter motor 208 by appropriate means. As but one example of how the housing 12 can be mounted on the starter motor casing 222, a bracket 14 (FIG. 1) is surroundingly engaged with the housing 12 and casing 222 to clamp the housing 12 against the casing 222. Alternatively, the starting current power line 220 can be cut near (i.e., within a few inches of) the starter motor 208 and the housing 12 connected to and supported by the ends of the power line 220 in electrical series therewith.

Figure 3:
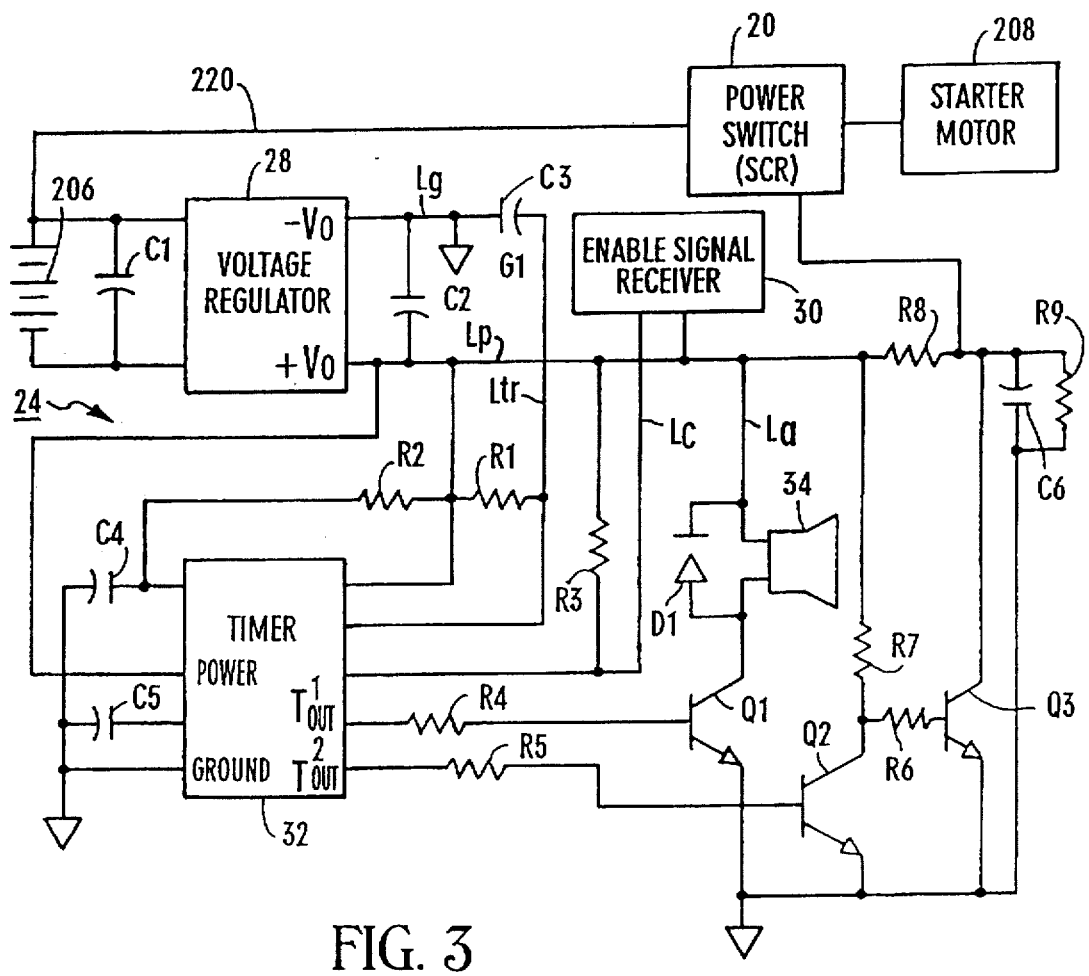
FIG. 3 is an electrical schematic view of the control circuit.
Figure 4:
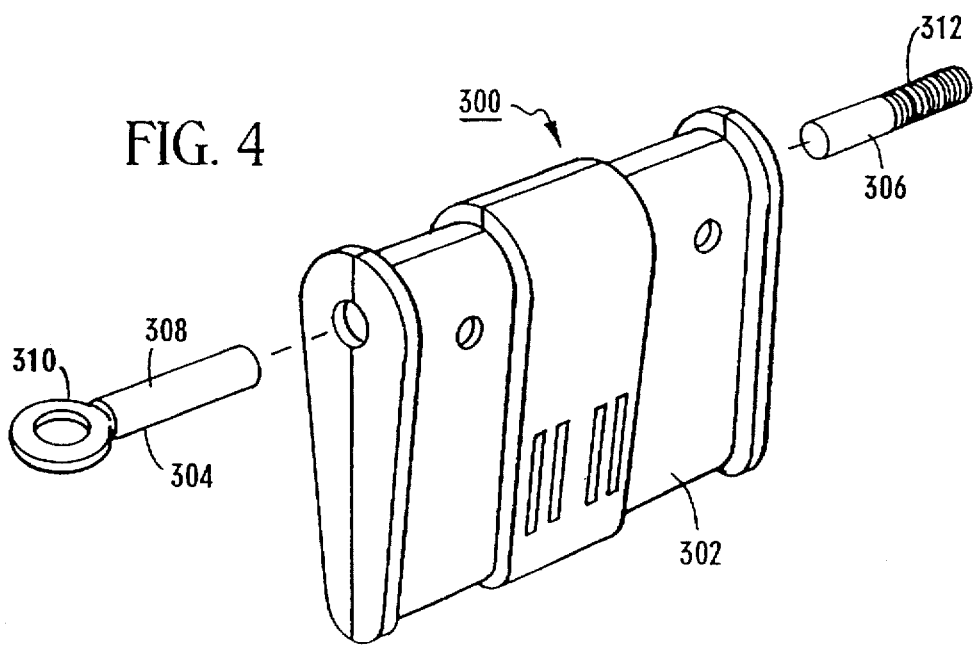
FIG. 4 is an exploded perspective view of the housing of the invention with mounting adapters.

In yet another alternate embodiment, referring briefly to FIG. 4, an antitheft system, generally designated 300, includes a housing 302. The system 300 shown in FIG. 4 is in all essential respects identical in configuration and operation to the system 10 shown in FIGS. 1-3, except that the housing 302 can be juxtaposed with a starter motor casing by means of rigid metal mounting adapters 304, 306. More specifically, a starter/solenoid adapter 304 includes an elongate electrically conductive shank 308 that is in electrical contact with components within the housing 302 in accordance with principles discussed below, and the adapter 304 includes a hollow eye 310 on the end of the shank 308 that is opposed to the housing 302. It will readily be appreciated that the eye 310 can be fastened to a starter solenoid lug in electrical contact therewith, both to support the housing 302 and to effect electrical communication between the starter/solenoid and the components within the housing 302. Likewise, a rigid elongate electrically conductive battery adapter 306 is in electrical contact with components within the housing 302 in accordance with principles discussed below, and the adapter 306 includes a partially threaded end 312 that is opposed to the housing 302 for establishing a lug onto which a battery cable can be fastened, to further support the homing 302 and to effect electrical communication between the battery and the components within the housing 302. In any case, all of the preferred embodiments include an antitheft system that juxtaposed with a starter motor casing either by being mounted directly on the casing or by being closely spaced from the casing and held next to the casing by means of rigid adapters or the starter motor cabling itself immediately next to the starter motor.

Referring back to FIG. 2, the starter motor 208 includes windings 224 that are electrically coupled to an externally threaded power terminal 226, as indicated by the dashed line 228. The power terminal 226 extends outwardly from the casing 222. In accordance with well-known principles, the power terminal 226 establishes a means by which the battery 206 can be electrically connected to the starter motor 208 to energize the windings 224, thereby activating the starter motor 208 to turn the Bendix gear 212.

FIG. 2, however, shows that instead of connecting the starting current power line 220 directly to the power terminal 226 of the starter motor 208 as in a conventional ignition system, per the present invention the power line 220 is connected to an externally threaded terminal 16 of the antitheft system 10 by means of a battery connector 230. As can be appreciated in reference to FIG. 2, the battery connector 230 is held onto the terminal 16 in electrical contact therewith by a nut 18 that is threadably engaged with the terminal 16.

In turn, the terminal 16 is electrically connected to a power switch 20 that is disposed in the housing 12. Additionally, FIG. 2 shows that the power switch 20 is electrically connected to a starter connector 22. As can be appreciated in reference to FIG. 2, the starter connector 22 is held onto the power terminal 226 of the starter motor 208 in electrical contact therewith by a nut 232 that is threadably engaged with the power terminal 226.

Thus, in accordance with the present invention and as shown in FIG. 2, the power switch 20 is connected in electrical series in the starting current power line between the battery 206 and the starter motor 208. Consequently, in the present invention the staffer motor cannot receive current from the battery 206, even when the starter switch 218 of the vehicle 200 is closed, unless the power switch 20 is also closed. Furthermore, as described below, the power switch 20 closes to complete the electrical circuit between the battery 206 and starter motor 208 only when a control circuit 24 in the housing 12 receives an enable signal from an enable signal generator 26 (FIG. 1).

Advantageously, the enable signal generator 26 is a handheld (and thus portable) manipulable device which can be conveniently coupled to the key 204. In the presently preferred embodiment, the generator 26 is a radiofrequency (rf) amplitude modulated (AM) transmitter model no. TX-99K, made by Ming. When appropriately manipulated, the generator 26 broadcasts a coded enable signal to the control circuit 24 to close the power switch 20. If desired, the control circuit 24 can be "trained" to accept the code of a preexisting rf transmitter that is concurrently used for, e.g., remotely opening the door locks of the vehicle 200 as a person approaches the vehicle 200.

FIG. 3 shows the details of the control circuit 24. As shown, a voltage regulator 28 is connected in parallel with the battery 206. The regulator 28 includes a twelve volt power output port $+V_o$ that is connected to a control circuit power line $L_p$. Also, the regulator 28 includes a ground port $-V_o$ that is connected to a control circuit ground line $L_g$ having an isolated ground G1. In accordance with the present invention, the regulator 28 maintains a constant voltage in the control circuit 24 while the power switch 20 is closed and the engine 210 is cranking during start-up. In the preferred embodiment, the voltage regulator 28 is a type 4007 12 volt power module made by Burr-Brown.

As shown in FIG. 3, an input capacitor C1 is connected in parallel with the battery 206 and the input ports of the regulator 28. Also, an output capacitor C2 is connected in parallel with the output port $+V_o$ and ground port $-V_o$ of the regulator 28. The preferred values of the resistors and capacitors of the present invention are set forth in Table 1 below.

An enable signal receiver 30 is connected to the power line $L_p$. In the presently preferred embodiment, the receiver 30 is a type RE-99 receiver made by Ming. In accordance with the present invention, the receiver 30 receives the enable signal from the enable signal generator 26 (FIG. 1), and in response sends a control signal to a timer 32 via a control signal line $L_c$.

Preferably, the timer 32 is a chip trigger timer, and more preferably a type 556 dual timer made by, e.g., National Semiconductor. Accordingly, the skilled artisan will recognize that the timer 32 receives a relatively short duration control signal from the receiver 30 and outputs a relatively longer duration output pulse at first and second output ports $T_{out}^1$ and $T_{out}^2$.

As shown in FIG. 3, the timer 32 is connected to the ground line $L_g$ via a timer regulator line $L_{tr}$ and a capacitor C3. Additionally, the timer 32 is connected to a first time delay capacitor C4 as shown, and the first time delay capacitor C4 is connected to the timer regulator line $L_{tr}$ via two resistors R1, R2. A second time delay capacitor C5 is connected between the timer 32 and ground in parallel with the first time delay capacitor C4. Moreover, as shown a ground port GND of the timer 32 is connected directly to ground, while a power port PWR of the timer 32 is connected to the power line $L_p$. In the preferred embodiment shown, a resistor R3 is connected between the power line $L_p$ and the control signal line $L_c$.

As intended by the present invention, the timer 32 in combination with the time delay capacitors C4, C5 resistors R1, R2 establishes a time delay circuit that defines a predetermined enable period, during which period the power switch 20 is closed as further disclosed below. In the preferred embodiment, the predetermined enable period is about one minute in length. Additionally, the receiver 30 with resistor R3 establishes a trigger circuit for triggering the timer 32 to output voltages at the output ports $T_{out}^1$ and $T_{out}^2$. It is accordingly to be understood that the output voltages are generated at $T_{out}^1$ and $T_{out}^2$ only during the entire enable period.

Continuing with the description of the control circuit 24 shown in FIG. 3, the first output port $T_{out}^1$ is connected to the base of a type 2N2222 alarm transistor Q1 via a resistor R4. In turn, the collector of the alarm transistor Q1 is connected to an audible alarm 34. A type 1N4001 protect diode D1 is connected in parallel to the alarm 34 as shown. In one presently preferred embodiment, the alarm 34 is a piezoelectric beeper that emits a beeping sound during the predetermined enable period. As shown, the alarm 34 is connected to the power line $L_p$ via an alarm line $L_a$, with the emitter of the alarm transistor Q1 being connected to ground.

FIG. 3 also shows that the second output port $T_{out}^2$ is connected to the base of a type 2N2222 driver transistor Q2 via a resistor R5. In turn, the collector of the driver transistor Q2 is connected to the base of a type 2N2222 power switch transistor Q3 via a resistor R6. As also shown, the collector of the driver transistor Q2 is connected to the power line $L_p$ via a resistor R7, and the collector of the power switch transistor Q3 is connected to the power line $L_p$ as well, with a resistor R8 separating the connections of the transistors Q2, Q3 to the power line $L_p$. The emitters of both the driver transistor Q2 and power switch transistor Q3 are connected to ground as shown. In the preferred control circuit shown, an RC circuit including a capacitor C6 and resistor R9 is connected between ground and the power line $L_p$.

As shown in FIG. 3, the power switch 20 is connected to the power line $L_p$ between the resistor R8 and the RC circuit established by the capacitor C6 and resistor R9 for controlling the power switch 20. The power switch 20 is preferably a solid state power switch, such as a field effect transistor, bipolar transistor, or silicon controller rectifier (SCR). More preferably, the power switch 20 is an SCR. As recognized by the present invention, by making the power switch 20 an SCR, repeated reliable cycling of the power switch 20 is facilitated, notwithstanding the fact that it must pass the relatively high current in the starting current power line 220.

With the above disclosure in mind, the operation of the antitheft system 10 can be appreciated. A person can manipulate the enable signal generator 26 (FIG. 1) to generate an enable signal. The enable signal receiver 30 (FIG. 3) receives the signal and triggers the timer 32 to output voltages at its output ports $T_{out}^1$ and $T_{out}^2$ for the predetermined enable period defined by the time delay circuit described above.

In response to the output signal at the first output port $T_{out}^1$, the alarm transistor Q1 causes the alarm 34 to beep, indicating that the ignition system of the vehicle 200 is enabled. Simultaneously, in response to the output signal at the second output port $T_{out}^2$, the driver transistor Q2 and power switch transistor Q3 send a control signal to the power switch 20 to cause it to close.

While the power switch 20 is closed during the predetermined period, the ignition system of the vehicle 200 is enabled. Consequently, a person can engage the key 204 with the ignition switch 202 and start the engine 210 by turning the key 204. On the other hand, in the absence of an enable signal or after the predetermined period has elapsed, manipulation of the key 204 cannot start the vehicle 200, because the electrical path between the battery 206 and starter motor 208 is interrupted by the open power switch 20.

TABLE 1

| Component | Value (farads/ohms) |
| --- | --- |
| C1 | 10 µF |
| C2 | 10 µF |
| C3 | 47 µF |
| C4 | 47 µF |
| C5 | 10 µF |
| C6 | .01 µF |
| R1 | 1.1 MΩ |
| R2 | 180 KΩ |
| R3 | 10 KΩ |
| R4 | 470 Ω |
| R5 | 470 Ω |
| R6 | 240 Ω |
| R7 | 240 Ω |
| R8 | 75 Ω |
| R9 | 1 KΩ |

While the particular ANTITHEFT INTERRUPT SYSTEM FOR VEHICLE STARTER POWER CIRCUIT as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

What is claimed is:

1. In a vehicle including a battery, a starter motor including starter motor windings and a power terminal electrically coupled to the starter motor windings, an antitheft system, comprising:

a housing;

a starter motor power line mechanically coupled to the housing and electrically connected to the starter motor windings;

a battery power line mechanically coupled to the housing and electrically connected to the battery, the battery power line and starter motor power line supporting the housing therebetween;

a power switch disposed in the housing in electrical series between the battery power line and starter motor power line; and a control circuit electrically connected to the power switch and responsive to an enable signal to close the power switch upon receipt of the enable signal, wherein the control circuit includes:

a time delay circuit for causing the power switch to open when a predetermined period after receipt of the enable signal has elapsed; and an audible alarm, the control circuit activating the audible alarm during at least a portion of the predetermined period.

2. The antitheft system of claim 1, wherein the power switch is a solid state switch.

3. The antitheft system of claim 2, wherein the solid state switch is a silicon controlled rectifier (SCR).

4. The system of claim 3, further comprising a portable enable signal generator for generating the enable signal.

5. The system of claim 1, wherein the vehicle includes an ignition switch, and the control circuit further includes a voltage regulator for maintaining a predetermined constant voltage in the control circuit during the predetermined period when the ignition switch is closed.

6. The system of claim 1, further comprising respective rigid electrically conductive adapters for mechanically coupling the starter motor power line and battery power line to the control circuit.

7. The system of claim 1, in combination with the vehicle.

8. An antitheft system for completing an electrical path between a vehicle battery power line and a vehicle starter motor upon receipt of an enable signal, comprising:

an enable signal generator for generating the enable signal;

a power switch in series between the battery power line and the starter motor and at least partially supported by the battery power line; and a control circuit for receiving the enable signal and closing the power switch in response thereto, the control circuit including a time delay circuit for opening the power switch when a predetermined period after receipt of the enable signal has elapsed; and a voltage regulator for maintaining a predetermined constant voltage in the control circuit.

9. The system of claim 8, further comprising a housing for holding the power switch and the control circuit.

10. The system of claim 9, wherein the starter motor includes windings and a power terminal electrically coupled to the windings, and the system further includes:

a battery connector configured for engaging the power line; and a starter connector configured for engaging the power terminal, wherein the power switch is connected in electrical series between the connectors.

11. The system of claim 10, wherein the power switch is a silicon controlled rectifier (SCR).

12. The system of claim 8, in combination with a vehicle.

13. In a vehicle including a battery, a starter motor including windings, a starter motor power line for electrically connecting the battery to the starter motor windings, an antitheft system, comprising:

a housing;

a starter motor power line mechanically coupled to the housing and electrically connected to the starter motor windings;

a battery power line mechanically coupled to the housing and electrically connected to the battery, the battery power line and starter motor power line supporting the housing therebetween;

a power switch disposed in the housing in electrical series between the battery power line and starter motor power line; and a control circuit electrically connected to the power switch and responsive to an enable signal to close the power switch upon receipt of the enable signal.

14. In a vehicle including a battery, a starter motor including windings, a starter motor power line for electrically connecting the battery to the starter motor windings, an antitheft system, comprising:

a power switch;

a housing for holding the power switch;

a starter motor power line electrically connected to the starter motor windings;

a first rigid connector electrically connecting the starter motor power line to the power switch and mechanically coupling the starter motor power line to the housing;

a battery power line electrically connected to the battery;

a second rigid connector electrically connecting the battery power line to the power switch and mechanically coupling the battery power line to the housing, such that the housing is supported only by the power lines; and a control circuit electrically connected to the power switch and responsive to an enable signal to close the power switch upon receipt of the enable signal.

15. The system of claim 14, wherein the control circuit comprises:

- a time delay circuit for causing the power switch to open when a predetermined period after receipt of the enable signal has elapsed; and
- an audible alarm, the control circuit activating the audible alarm during at least a portion of the predetermined period.

16. The system of claim 14, wherein the control circuit closes the power switch for a time period upon receipt of the enable signal, and the control circuit includes:

- a voltage regulator for maintaining a constant predetermined voltage to the control circuit during at least a portion of the time period.

17. The system of claim 16, wherein the control circuit further comprises:

- a time delay circuit for causing the power switch to open when a predetermined period after receipt of the enable signal has elapsed; and
- an audible alarm, the control circuit activating the audible alarm during at least a portion of the predetermined period.

* * * * *